June 9, 1936.   C. T. WALTER   2,043,685
METHOD OF MAKING TUBE SOAP
Original Filed Dec. 21, 1933   2 Sheets—Sheet 2

Charles T. Walter
INVENTOR

Witness-
Wm C. Meiser

BY Tony W. Johns.
ATTORNEY

Patented June 9, 1936

2,043,685

UNITED STATES PATENT OFFICE 2,043,685

METHOD OF MAKING TUBE SOAP

Charles T. Walter, Chicago, Ill., assignor to Industrial Patents Corporation, Chicago, Ill., a corporation of Delaware Original application December 21, 1933, Serial No. 703,350. Divided and this application July 28, 1934, Serial No. 737,345

12 Claims. (Cl. 18—48)

This application is a division of my application entitled Soap product and method of making the same, filed December 21, 1933, Serial No. 703,350.

The present application relates to a method of making a new soap product.

One of the objects of the invention is to provide a method for preparing a new soap product of desirable form which is very readily soluble in water.

Another object of the present invention is to provide a method for preparing such product.

Other objects of the invention will be apparent from the description and claims which follow.

Referring now to the drawings.

Figure 1:
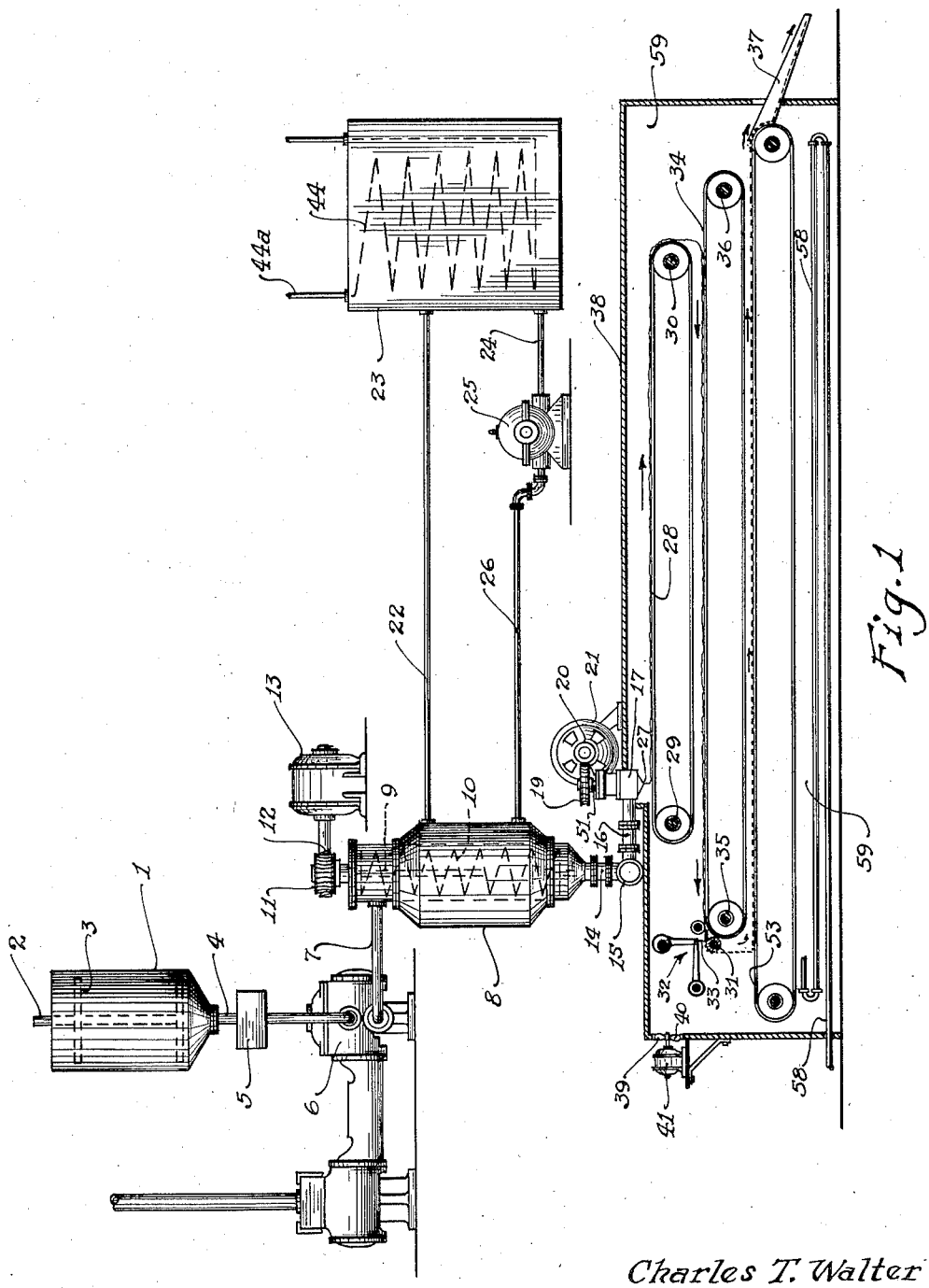
Figure 1 illustrates equipment which may be employed in carrying out the method.

Referring now more particularly to Figure 1:

1 is a tank in which hot soap stock may be placed. Tank 1 is provided with shaft 2 on which are mounted agitator blades 3. Soap passes from tank 1 through line 4 and filter 5 and is forced by the action of pump 6 through line 7 into jacketed cooler 8 in which is mounted shaft 9 provided with agitator blades 10.

Shaft 9 is driven through gears 11 and 12 by motor 13. Soap stock passes from the jacketed cooler 8 through line 14, header 15 and line 16, through extrusion nozzle 17. It will be noted that extrusion nozzle 17 is provided with a central pin 18 rotated by gears 19 and 20, worm gear 20 being driven by motor 21. Jacketed cooler 8 is cooled by water or brine circulating through line 22, tank 23, line 24, pump 25 and line 26. Any suitable refrigerating means may be used for cooling the water in tank 23 as coil 44 supplied from a compressor, not shown, through line 44a.

The soap is forced through nozzle 17, leaving nozzle 17 at point 27 in the form of a tube or ribbon and falls upon conveyor 28. Conveyor 28 is mounted on shafts 29 and 30. The soap is carried by the conveyor 28 in the direction of the arrows, passing over the end of the conveyor and falling upon conveyor 34 mounted upon shafts 35 and 36, and carries the soap in the direction of the arrows, whereupon it passes over wheel 31 at which point the tubes are cut into small sections by cutter 32 provided with reciprocating blade 33, after which the soap falls in minute sections to conveyor 53 to be carried once more the length of the drying tunnel and ejected down slide 37.

The tubes, leaving the first stage of drying, passing from conveyor 28 to conveyor 34, are sufficiently flexible to pass over the rounded end of the conveyor without damage. As many stages of drying may be provided as are necessary, depending upon the length of the tunnel, speed of operation of the conveyors and temperature of the atmosphere therein.

Roller 31 is preferably made of rubber, providing a yieldable anvil for blade 33. It will be understood, of course, that other types of cutters may be substituted for the type shown. For example, a roller may be provided with a plurality of blades contacting the rubber roller or anvil 31 over which the tubes pass after they are sufficiently dried. An example of a cutter which may be used is disclosed in my copending application entitled Soap cutter, Serial No. 732,001, filed June 23, 1934. It will be noted that the extrusion nozzle and the conveyors are housed in housing 38 which is preferably supplied with warm air through opening 39 by the action of fan 40 operated by motor 41. If desired, heating coils 58 may be placed in tunnel 59 within housing 38.

The tubes may be packed into cartons or other containers immediately after cutting, or if desired, they may be subjected to a further drying operation which will have a tendency to reduce the weight shrinkage that will naturally occur in the event of a long period of holding in a dry room.

Where it is desired to further dry the tubes after cutting, a convenient arrangement is provided by placing a conveyor beneath the last drying stage preceding the knife in such manner that the cut pieces will be received directly from the knife, the last mentioned conveyor being, of course, within the drying tunnel and discharging to the slide 37 or equivalent discharge means. It will be further understood, of course, that as many drying stages as desired may be installed both before and after the knife.

Figure 2:
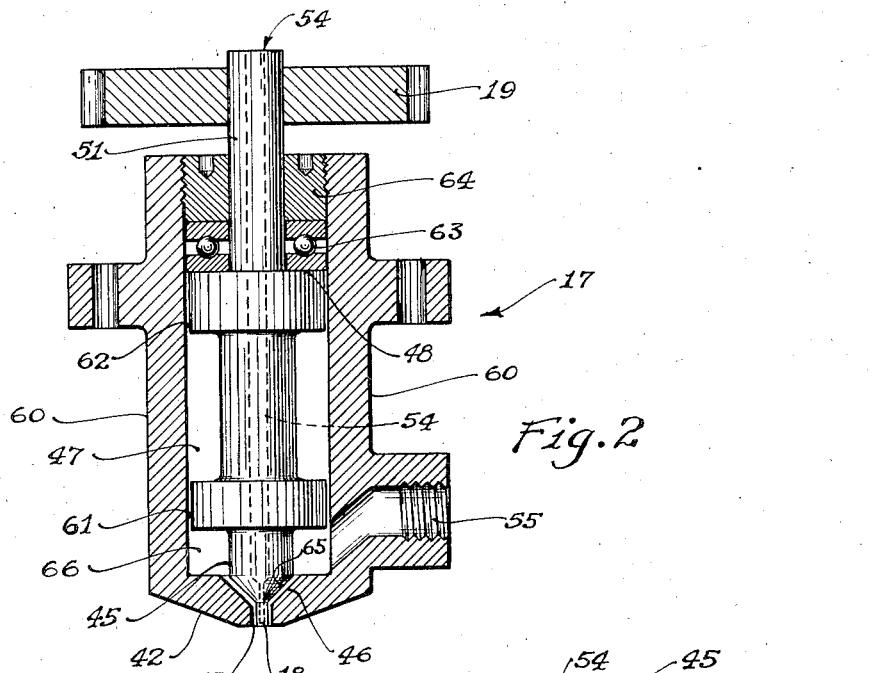
Figure 2 illustrates the type of extrusion device which may be used.
Figure 2A:
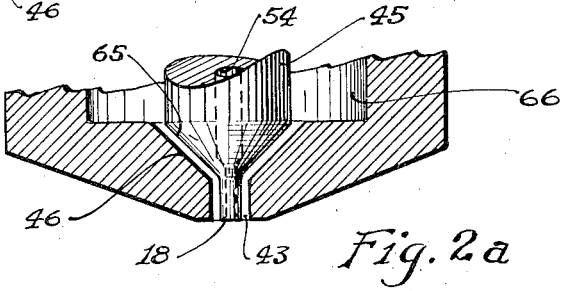
Figure 2a is an enlargement of the extrusion end of the nozzle shown in Figure 2.

It will be understood, of course, that as many extrusion nozzles as desired may be mounted and supplied from the header 15. The extrusion die disclosed in cross section in Figure 2 is one type of die which may be used in the forming of the soap, particularly of the type shown in Figure 3.

Referring now more particularly to this figure:

Die plate 42 is provided with an extrusion opening 43. Pin 18 is integral with and held in place by a spindle body 45 which rides on the cylindrical surface of chamber 47 of the die body 60 at bearing points 61 and 62. These bearings guide the spindle 45 and enable it to rotate maintaining pin 18 in the center of hole 43. Shoulder 48 of spindle 45 exerts a thrust load against ball 60 thrust bearing 63 which in turn transmits the thrust load to nut 64 which is screwed into die body 60. The clearance between spindle body conical surface 65 and surface 46 is somewhat greater than the clearance between pin 18 and the side walls of opening 43. Extension shaft 51 of spindle 45 passes through bearing 63 and nut 64 and carries gear or sprocket 19 by which the spindle 45 may be rotated. Breather tube 54 passes from pin 18 through the spindle body 45, extension shaft 51 and gear 19.

Soap stock is fed into chamber 66 through opening 55, finds its way between the surface of spindle body 45 and the surface 46 of chamber 66 and passes out opening 43. Where it is desired to prepare soap in the form shown in Figure 3, air is permitted to enter through the breather tube 54, thus preventing the walls 56 of tube 57 from collapsing.

No claim is made in this application to the extrusion device shown in Figure 2, this device being one embodiment of my invention more particularly described and claimed in my copending application entitled Extrusion device, Serial No. 703,351, filed December 21, 1933.

Soap stock, plastic but not liquid at the time it reaches the extrusion device, of the usual consistency of soap stock coming from chilling rolls preparatory to drying for chips or the like is satisfactory for the manufacture of the product of the present invention. Soap stock in this condition is forced through one or more extrusion dies and may then be deposited upon a conveyor in a drying tunnel such as is shown in Figure 1. If desired, the extruded soap may be dried by dropping it down a tower in which the soap is brought in contact with dry, heated air. A desirable type of drying mechanism is described and claimed in my copending application entitled Drier conveyor, Serial No. 703,348, filed December 21, 1933. Any other equipment or method of drying may be employed.

The extruded soap, whether in the form of a tube or otherwise, upon drying, becomes friable, in which condition it may be readily cut up into pieces of a short length. The tubular form lends itself to precise mechanical control of the important dimensions of the individual pieces of the final soap product.

The diameter of the tube and the thickness of the walls may be maintained with exact uniformity at all times and thus the rate of solubility may be controlled. Where a large volume per given unit of soap stock is desired, the thickness of the tube walls and the diameter of the tube may be adjusted to give any desired apparent specific gravity.

Soap stock of the formulae usually used for the manufacture of soap chips, laundry flakes and the like, is suitable for the manufacture of the product of the present invention. For example: A finished soap product having the following analysis is suitable for manufacture under the conditions mentioned:

*Example I*

| | Per cent |
|---|---|
| Dry soap | 76½ |
| Silicate (dry basis) | 11 |
| Soda ash | 2½ |
| Moisture | 10 |

Another example of a finished soap product suitable for manufacturing by this process shows the following analysis:

*Example II*

| | Per cent |
|---|---|
| Dry soap | 60 |
| Silicate (dry basis) | 20 |
| Soda ash (dry) | 2 |
| Moisture | 18 |

It will be noted that these two formulae differ widely in the quantity of dry soap they contain, the quantity of filler and the amount of moisture. These two examples are cited to show the wide flexibility of the process for we find that either of these formulae may be handled with equal facility.

The preferred method of manufacture is to start with a hot liquid soap having a temperature of approximately 180° F. At this temperature, the soap stock is a liquid and flows readily through pipes by gravity or under the influence of pump pressure.

This liquid soap stock is picked up by a suitable pump and caused to flow under pressure through a suitable filter device for removing small particles of dirt or fibers which frequently find their way into the soap mixture.

From the filtering device the soap stock is passed into a suitable heat exchanger which removes the sensible heat and latent heat of fusion and brings about a congealing action. The temperature of the soap leaving the cooler may be any convenient desired degree. For example: A temperature of 70° F. is satisfactory.

In this connection, we have found that plastic soap at a temperature of as high as 90° F. can be successfully extruded into reasonably strong self-supporting tubes. At lower temperatures the tube becomes stronger and will stand more handling without breaking or collapsing.

As the soap leaves the heat exchanger, it is in a stiff plastic condition. It will flow through pipes and other conduits under the influence of a sufficiently great pressure. It can even be forced through a fine mesh filter screen in this condition and we find it expedient to subject the material to a secondary filtering operation at this stage in order to insure that no solid particles of substantial size remain in the mass as it flows to the extrusion device.

From the heat exchanger the plastic soap is forced through pipe lines to a multiple number of extrusion nozzles attached to the manifold.

An alternate method which may be used to prepare soap in tubular form is to first chill the soap stock having the desired formula by either passing it over a chilling roll as in the manner for manufacturing soap chips or casting it in blocks as in the manner for manufacturing laundry soap and the like in bar form. This chilled soap is not permitted to dry and in such a condition is plastic and may be made to readily flow under pressure.

This chilled plastic soap may be placed in a cylinder in which operates a plunger and when sufficient pressure is exerted on the plunger, the soap will flow through the system which should consist of a filtering device and the extrusion nozzles.

It will be noted that this method differs from the preferred method described above only in that in this latter method the chilling of the liquid soap to a stiff plastic condition takes place outside of the pressure system.

In the preferred system the soap is more readily handled by the pump and the system lends itself more readily to continuous operation.

The amount of drying or solidifying effect which must take place to bring the tubes into the proper state for cutting depends upon the nature of the soap stock from which the tubes are made.

In general, soap stocks which contain a large percentage of filler such as Example II given above, dry or solidify to a suitable degree for cutting in an appreciably shorter time under the same drying conditions than do formulae containing less filler as illustrated in Example I. We have found that there is an optimum condition reached during the drying process in which the soap must be cut into pieces in order to get the best results.

If an attempt is made to cut the soap tubes before they have solidified sufficiently, the pressure of the cutting knife will cause the tubes to flatten appreciably at the point of cutting. This results in small tubular elements with partially closed ends.

On the other hand, if tubular soap is cut beyond a certain stage of dryness, it is found that a considerable percentage of the tubular elements break into small splinters. We have found that this range of dryness in which cutting may take place satisfactorily is reasonably broad and may readily be obtained with ordinary commercial drying apparatus.

The product resulting from the practice of the method of the present invention has many advantages over other soap products. In recent years it has been proposed to prepare soap in the form of small, hollow spheres or beads, this being done by the separate drying method. One method in vogue for forming bead soap is to separate the stock in a rather liquid condition in the form of small soap bubbles in drying towers, the product being cooled in the form of dried, hollow beads by any appropriate dust collecting apparatus.

The spheres or beads formed in this manner are irregular in shape and size and have a decided tendency to powder. This tendency to powder results in the accumulation of fines in packages of the material. Furthermore, this type of product tends to lump when poured in water and the fines which rise in the form of dust when a quantity is poured from the package into water are often decidedly offensive to the nostrils.

Soaps prepared in tubular form in accordance with the present invention, depending upon dimensions, show varying weight volume relationship as indicated in the following table:

| Outside diameter | Wall thickness | Approximate length of individual pieces | Pounds per cubic foot |
| --- | --- | --- | --- |
| Inches | Inches | Inches | |
| .09 | .0055 | ¼ | 13.1 |
| .09 | .0055 | ⅝ | 11.2 |
| .09 | .0045 | ¼ | 12.5 |
| .09 | .0045 | ⅝ | 10.6 |
| .09 | .0035 | ¼ | 10.6 |
| .09 | .0035 | ⅝ | 8.7 |
| .07 | .0055 | ¼ | 14.4 |
| .07 | .0055 | ⅝ | 13.1 |
| .07 | .0035 | ¼ | 11.9 |
| .07 | .0035 | ⅝ | 9.4 |

The tube soap prepared in accordance with the present invention is mechanically strong, does not powder easily, does not have a tendency to produce fines, does not lump in water and may be easily prepared of such a wall thickness and diameter that it will dissolve more quickly than the bead type soap.

The preferred commercial form of the tube soap prepared in accordance with the present application is a plurality of individual pieces having an outside diameter of from .07 to .09 inch and a wall thickness of from .0035 to .0055 inch. The tubes may be from one-fourth inch to three-fourths inch in length.

Since these small tubes are open at both ends, water enters the inside of the tube by capillary action and the walls of the tube dissolve simultaneously from both the outside and the inside surfaces.

The advantage of this tube type of soap over soap flakes, for example, is similar in many respects to the advantages over bead soap, there being the additional advantage that in the case of soap flakes the flakes tend to pack and stick together, thus cutting down dissolving surface area whereas there is no such tendency in the case of tube soap.

Various means may be employed to cut the extruded tubes into sections of the desired length. In the operation of the equipment shown in Figure 1 conveyor 28 may be operated rapidly enough so that the tubes are moist when they pass over the wheel 31, under the cutter 32. Blades 33 of cutter 32 may be adjusted to merely nick the tubes so that when the tubes are dry after leaving conveyor 53, they may be readily broken up into the sections indicated by the nicks.

It is preferable, however, to completely sever the sections, the conveyor 28 being of sufficient length and driven at a proper speed so that the tubes are at a proper state of dryness when they pass the cutter 32 to be entirely cut up in sections of the desired length. It is unsatisfactory to attempt to cut the tubes immediately after coming from the extrusion nozzle, since the tubes are in such plastic condition at that time that there is a likelihood of collapse.

If it is attempted to cut the tubes after they become perfectly dry, it is difficult to secure clean cuts without shattering the tube walls to some extent. It has been found necessary in practice in order to produce a continuous tube of soap to rotate the pin 18 while soap is being extruded and permit air to enter through the breather tube 54 to prevent collapse of the tube. If it is desired to form ribbons of soap of the type shown in cross section in Figure 4, a vacuum of about three-fourths inch of water is drawn on the breather opening which fully collapses the tube and forms a substantially flat ribbon which may be dried and cut into short lengths in the manner described for the tube soap.

I have found that the tube soap may be given a glossy finish by heating the nozzle of the extrusion plate to a temperature of from 160° to 180° F. The action of the heated nozzle would seem to produce a skin effect on the extruded soap, a very thin film of soap being heated and probably melted. The depth of this heating effect is not sufficient to materially affect the strength of the extruded tube. After being in contact with the cool air for a few seconds after leaving the extrusion die, the more or less molten outside film or skin solidifies into a smooth, glossy surface which is thereafter retained indefinitely.

The nozzle of the extrusion die may be heated by means of a hot water jacket around its lower end, which provides enough heat to the apparatus to compensate for the heat removed by the stream of soap flowing through it, thus maintaining a constant temperature.

Figure 3:
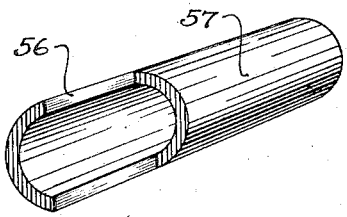
Figure 3 is a perspective view partly in section of a preferred embodiment of the product of the present invention.
Figure 4:
Figure 4 is a sectional view of another embodiment of the product of the present invention.

If a glossy finish is not desired, the suede finish common in soap products may be secured by extruding the soap with the extrusion nozzle at atmospheric temperatures. Soap containing filler, heat treated as has just been described, gives every appearance of a milled soap not containing filler.

Where it is desired to form a soap product of the type depicted in cross section in Figure 4, the same extrusion die used in the formation of the tube soap shown in Figure 3 is used. In the formation of the tube soap, it is necessary to permit air to enter the tube as it is being formed to prevent partial collapse of the delicate tube.

At high extrusion velocities it is necessary to force air into the tube through the breather tube under pressure. If the breather hole through the extrusion pin of the nozzle is closed, the tube that is formed partially collapses and approaches a ribbon in shape.

If a vacuum of about three-fourths inch of water is drawn on the breather opening, the tube is fully collapsed and forms a substantially flat ribbon, giving the appearance in cross section shown in Figure 4. This ribbon may, of course, be dried and cut into short lengths in the manner described in connection with the description of the tube soap. The ribbon soap may be passed through a heated extrusion nozzle precisely in the manner described in connection with the tube soap in order to secure a glossy milled appearance.

The apparent specific gravity of the ribbon soap is not as great as that of the tube soap. However, the ribbon soap goes into solution readily, packs well in a barrel or similar container and will not clump together and form large masses. The individual pieces are mechanically strong and do not readily break up into a powder, thus giving the ribbon soap a decided advantage over the ordinary soap chip now commonly used, especially in commercial laundry work.

In comparatively large scale operations, I have successfully started with soap in a hot liquid state, the soap being drawn from a small jacketed agitator by a suitable pump. The pump forces the hot soap stock through a cooling device in which it is reduced to a stiff, plastic mass suitable for forming into thin-walled, self-supporting tubes. The cooling device is preferably equipped with a mixing or stirring device to bring about uniform cooling and mixing of the material as it passes through the cooler. From the cooler, the plastic soap is delivered to a manifold and thence to a multiple number of extrusion dies.

The plastic soap emerges from the dies in the form of a continuous length of thin-walled tubes which are received upon a drying conveyor. After the tubes are partially dried they are passed through a cutting device consisting of a plain roller having a smooth machine surface adapted to engage with a second roller carrying a series of knife edges. From this cutting device the soap tubes are discharged in the form of tubular elements, which upon completion of drying are ready for packaging.

A preferred form of arrangement of the extrusion dies and drier conveyor is shown in my copending application entitled Drier conveyor, Serial No. 703,348, filed December 21, 1933. A preferred form of extrusion device is shown in my copending application entitled Extrusion device, Serial No. 703,351, filed December 21, 1933.

I have found that the peculiarities of soap stock are such as to prevent the formation of a continuous length of perfect tube by simple extrusion through an orifice. If, for example, soap stock is forced through an extrusion die comprising a central opening with a cylindrical pin positioned centrally thereof, a smooth, ribbon-like product results. The ribbon assumes an irregular corkscrew shape. The extrusion die frequently clogs, preventing the formation of product of any great length. If an open tube is substituted for the circular pin in the simple extrusion device now under discussion, a tube will be formed at low extrusion velocities. However, after a few inches of the soap stock have been extruded, the tube will break off and the die clog. If higher extrusion velocities are attempted, it is necessary to force air through the opening in the circular tube to prevent collapse of the soap tube walls. However, even though this be done a perfect tube will not be formed.

I am assuming here, of course, the formation of relatively small thin-walled soap tubes. I have found that it is necessary to continuously rotate the central pin in order to form a continuous length of soap tube. In the type of extrusion device disclosed in Figure 2 of the drawings, the pin is preferably rotated at about 100 R. P. M. although good results have been obtained with rotative speeds as low as 10 R. P. M.

It will be seen that the method involved in the present invention is not a mere forcing of a quantity of material through an orifice nor is the method in any way comparable to the well known expedient of forming relatively thick-walled tubing from plastic material by mere extrusion under pressure through an orifice defined by a pin or rod and a casing spaced from and around the pin. The present method is not one of merely pushing material through an orifice. In the present method, the plastic soap stock, passing through the orifice under pressure, is radially swept into the form of a thin-walled tube by the rotating action of the pin. The extrusion employed in the present invention is not extrusion in the broad or ordinary sense of the term, but rather is extrusion in the narrow sense of spinning or radially sweeping at the point of extrusion. It should be noted, also, that the tube walls thus formed are extremely thin and that the diameter of the tube is great, relative to the wall thickness.

I claim:

1. The art of preparing soap which comprises extruding liquid soap stock in the form of a thin-walled tube, subjecting the thin-walled tube to the drying effect of a heated air current and cutting the tubes at a predetermined stage in the drying process.

2. The method of preparing soap which comprises extruding liquid soap stock in the form of a ribbon-like thin walled collapsed tube, subjecting the extruded soap to the drying action of heated air, cutting the collapsed tubes into predetermined lengths at a predetermined stage in the drying process and thereafter completing the drying.

3. The method of forming soap which comprises forming plastic soap stock in the form of a thin-walled tube, semi-drying the tube so 4. The method of forming soap which comprises radially sweeping plastic soap stock into the form of a thin-walled tube and admitting air to the tube at the point of formation.

5. The method of forming soap which comprises radially sweeping plastic soap stock into the form of a thin-walled tube and applying a vacuum at the point of formation to collapse said tube in the form of a thin ribbon.

6. The method of forming soap which comprises spinning a soap ribbon by radially sweeping plastic soap stock into the form of a thin-walled collapsed tube.

7. The method of forming soap which comprises spinning a soap ribbon by radially sweeping plastic soap stock into the form of a thin-walled collapsed tube, semi-drying the ribbons so formed and cutting the ribbon while in semi-dried condition.

8. The method of forming ribbon soap which comprises radially sweeping soap stock in the form of a thin-walled tube and pulling a vacuum on the tube at the moment of formation whereby to collapse the tube into a ribbon having a smooth continuous surface.

9. The method of forming ribbon soap which comprises radially sweeping soap stock in the form of a thin-walled tube and pulling a vacuum on the tube at the moment of formation whereby to collapse the tube into a ribbon having a smooth continuous surface, semi-drying the ribbons so formed and cutting the ribbon while in semi-dried condition.

10. The method of forming a thin-walled soap tube which comprises spinning plastic soap stock by radially sweeping the plastic soap stock into tubular formation with extremely thin walls and large diameter relative to the wall thickness, admitting air to the tube at the time and point of formation, semi-drying the tube so formed and cutting the tube while in semi-dried condition.

11. The method of forming a thin-walled soap tube which comprises spinning plastic soap stock by radially sweeping the plastic soap stock into tubular formation with extremely thin walls and large diameter relative to the wall thickness and admitting air to the tube and applying heat to the outer surface of the wall of the tube at the time and point of formation.

12. The method of forming a thin-walled soap tube which comprises spinning plastic soap stock by radially sweeping the plastic soap stock into tubular formation with extremely thin walls and large diameter relative to the wall thickness, admitting air to the tube and applying heat to the outer surface of the wall of the tube at the time and point of formation, semi-drying the tube so formed and treated and cutting the tube while in semi-dried condition.

CHARLES T. WALTER.